United States Patent [19]

Mastache et al.

[11] Patent Number: 5,557,839
[45] Date of Patent: Sep. 24, 1996

[54] METHOD OF FABRICATING AN IMPROVED TRANSDUCER SUSPENSION ASSEMBLY

[75] Inventors: Mark Mastache; Peter A. Capano, both of Boise, Id.

[73] Assignee: Hewlett-Packard Company, Palo Alto, Calif.

[21] Appl. No.: 405,314

[22] Filed: Mar. 16, 1995

Related U.S. Application Data

[62] Division of Ser. No. 865,013, Apr. 8, 1992, abandoned.

[51] Int. Cl.⁶ ........................................... G11B 5/42
[52] U.S. Cl. ................................ 29/603.03; 360/98.07
[58] Field of Search .......................... 29/603, 603.03; 360/104–107, 97.01, 97.03, 98.02, 98.07

[56] References Cited

U.S. PATENT DOCUMENTS 5,153,794  10/1992  Reidenbach .......................... 360/104
5,283,704  2/1994  Hinlein .................................. 360/104

*Primary Examiner*—Carl E. Hall

[57] ABSTRACT

A hard disk drive having an actuator assembly in which the armstack structure comprises only load beams. The load beams are assembled by stacking on a tubular member along with the movable member of the actuator motor, or other actuator drive mechanism, and after alignment are secured to the tubular member. This actuator structure is applicable to both rotary and linear actuators in disk drives. In the rotary actuator structure, the tubular member or hub is journaled in the base of the drive for rotation about the axis of the tubular member. In the linear actuator structure, the tubular member, being fastened to the moving part of the linear drive mechanism, linearly moves with that mechanism. The load beams and the movable actuator drive mechanism are secured to the tubular member by a ball swaging operation which forcibly expands the tubular member into secure frictional engagement with the items assembled thereon to thereby integrate the assembly with a single ball swaging pass through a single member.

3 Claims, 5 Drawing Sheets

METHOD OF FABRICATING AN IMPROVED TRANSDUCER SUSPENSION ASSEMBLY

RELATED APPLICATION

This is a division of U.S. application Ser. No. 07/856,013, entitled "Disk Drive Having an Improved Transducer Suspension Assembly," filed Apr. 8, 1992, now abandoned.

This is related to a U.S. Application of George A. Drennen, Ser. No. 07/856,006, entitled "Disk Drive Having An Improved Transducer Suspension Assembly," filed Apr. 8, 1992, now U.S. Pat. No. 5,363,262.

FIELD OF THE INVENTION

This invention relates generally to disk drives and more particularly to the mechanical aspects of such drives as related to the transducer or head suspension assemblies.

BACKGROUND OF THE INVENTION

U.S. Pat. No. 4,829,329, to Coon et al, describes disk drives having transducer or head suspension assemblies in which individual load beams, carrying transducers at their distal ends, are attached at their mounting ends to individual arms of an armstack assembly by means of screws or ball swaged fittings. The thrust of the teachings of Coon et al is the reduction in the axial spacing of the disks, in order, by this expedient alone, to increase the volumetric density of recorded data by increasing the number of disks that can be packed in a given volume.

Trends toward smaller disk drives, particularly for applications where portability is a consideration, require drives of smaller form factor, of high data capacity, which are sufficiently rugged to withstand the mechanical shock associated with portability and which are light in weight. Down size scaling of drives, such as that of Coon et al, is not mechanically feasible. A new approach to the mechanical configuration of disk drives is needed to achieve a drive of significantly reduced form factor, providing improved performance in a mechanically abusive environment.

SUMMARY OF THE INVENTION

A significant reduction in the size of a disk drive is achieved, according to this invention, by attaching the load beam of the transducer or head suspension assembly directly to the moving part of the actuator drive motor or mechanism, eliminating unnecessary armstack and/or actuator structure therebetween. By this expedient, reductions in both the size and weight/inertia of the transducer actuator suspension assembly are achieved.

This invention is applicable in both linear and rotary actuator drives. The invention is disclosed herein in a rotary actuator drive configuration which embodies the applicant's best mode for practicing the invention.

In prior art types of rotary actuator disk drives, the transducer actuator/suspension assembly is journaled in bearings mounted upon a stationary support in the disk drive. Usually this support is the base and is so termed herein. The actuator assembly, as it moves angularly about the bearing axis, moves the transducers, individually connected to the respective arms of the actuator armstack, to different radial locations with respect to the surfaces of the disks.

In the implementation of the best mode for practicing this invention, the conventional actuator armstack structure of the rotary actuator, as seen in Coon et al, is eliminated. Instead, a spindle, comprising a cylindrical or tubular member preferably of circular cross section, functioning as the hub in the rotary actuator assembly, is rotably mounted in bearings on the disk drive base to rotate about its central axis. This tubular member has a flange adjacent one end. Load beams of flexible sheet steel, such as stainless steel sheet, are each provided with a reinforcing plate adjacent one end, the mounting end. An opening or hole is formed through the reinforcing plate and the load beam, sized to provide a slip or sliding fit over the tubular member. A transducer is attached to the other end, the distal end, of each load beam. A motor, preferably a voice coil motor, has a stationary part, the permanent magnets, fixed with respect to the base of the drive, and a moving part, the voice coil and its housing, is attached to the tubular member. In this attachment, the coil support or housing is provided with an opening or hole therethrough, in a location removed from the coil, which is sized to provide a slip or sliding fit over the tubular member. The load beams and the voice coil housing are stacked on the tubular member in a predetermined sequence, the stack seating on the flange. A bracket for supporting the transducer wires, usually a flat flexible circuit, is preferably included in the stack as the last addition to the stack. The load beams are aligned with each other and with the voice coil housing and are thereafter secured to the tubular member.

According to the best mode for practicing this invention, the stack assembly of the load beams and the coil housing and the bracket is maintained in alignment and compressed against the flange of the tubular member. While compression of this actuator stack is maintained, a swaging tool, preferably a swage ball, is forced through the central opening of the tubular member from the end opposite the flange end. This expands or enlarges the outer diameter of the tubular member in the openings or holes in the several parts in the actuator stack, securing the assembly.

BRIEF DESCRIPTION OF THE DRAWINGS

The invention will be better understood by reference to the following specification when considered in conjunction with the accompanying drawings, in which.

DETAILED DESCRIPTION OF THE INVENTION

Figure 1:
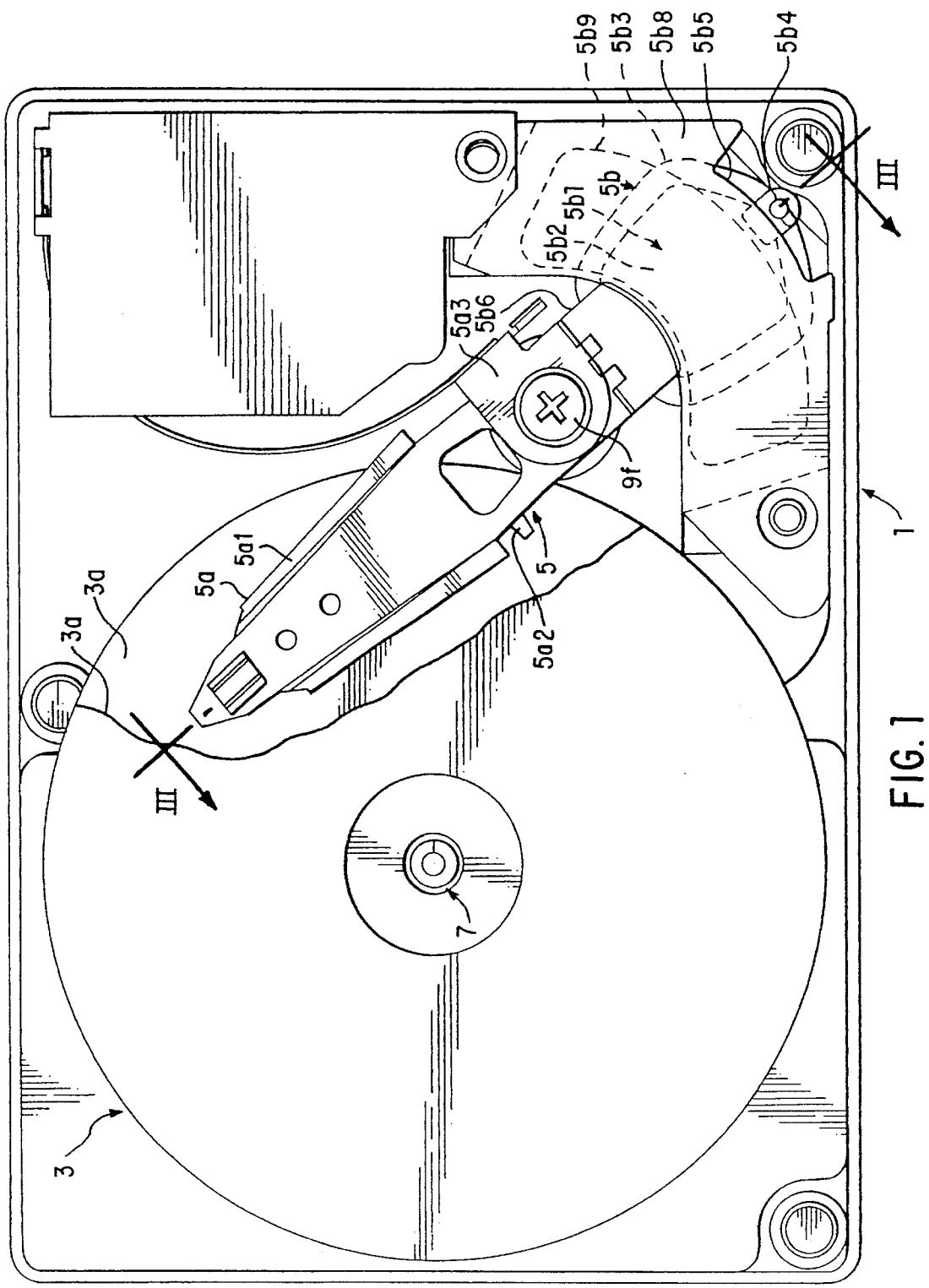
FIG. 1 is a plan view of a rotary actuator disk drive embodying the principles of this invention.
Figure 2:
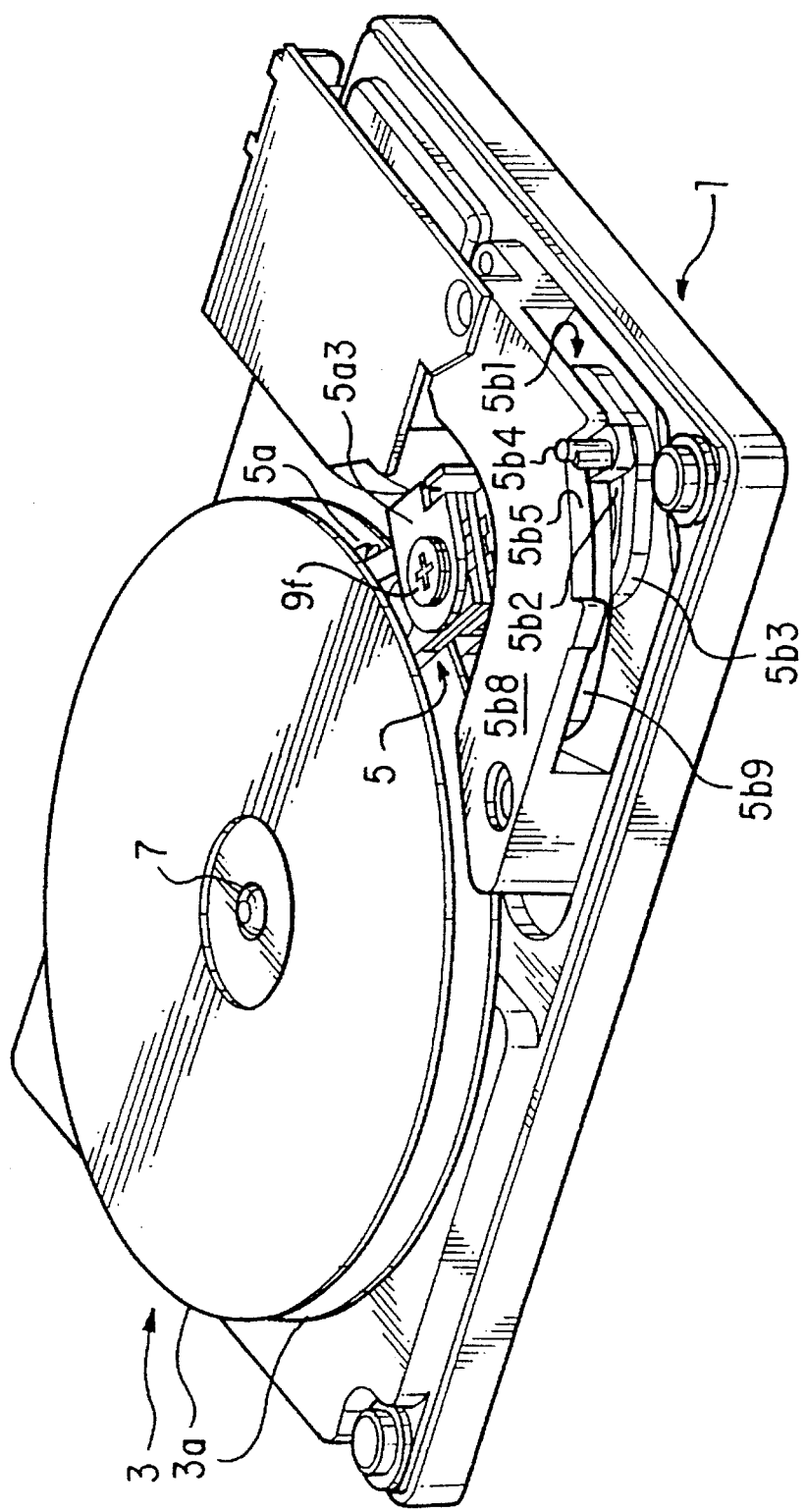
FIG. 2 is an isometric view of the disk drive of FIG. 1.

FIGS. 1 through 5 of the drawings illustrate a rotary actuator type of disk drive embodying the best mode for practicing this invention. The disk drive comprises a support or base 1 upon which a disk stack 3 and a rotary actuator assembly are rotatably mounted and sealed, within a housing, not shown. During operation, the disk stack 3 is rotated about the axis of a spindle 7 by an electric motor (not shown) at a predetermined constant speed, as is well known. The motor is secured to the base 1. The rotary actuator assembly 5 is assembled on a tubular member 9a, FIG. 3, which is a coaxial part of a two-piece spindle 9, the other part 9b of which is journaled in a pair of coaxial bearings 9c secured in the base 1. The rotary actuator assembly 5, comprises one or more load beams 5a, constituting an armstack, and a voice coil motor drive 5b therefor. A moving part 5b1 of the voice coil motor 5b has a coil support or housing 5b2 for a voice coil 5b3. An extension arm 5b6 of the coil support or housing 5b2 is stacked with the load beam or beams 5a, in a predetermined sequence, on the tubular member 9a and secured thereto. Angular movement of the rotary actuator assembly is limited by a crash stop structure comprising a pin 5b4 anchored in the coil support 5b2. The pin 5b4 projects adjacent an arcuate edge or recess 5b5 in an upper magnet plate 5b8 of the voice coil motor 5b, in which position the pin 5b4 engages the ends of the arcuate recess 5b5, to provide a mechanical limit to angular movement of the rotary actuator assembly 5. The upper magnet plate 5b8 supports a permanent magnet 5b9, forming part of the voice coil motor 5b.

Figure 3:
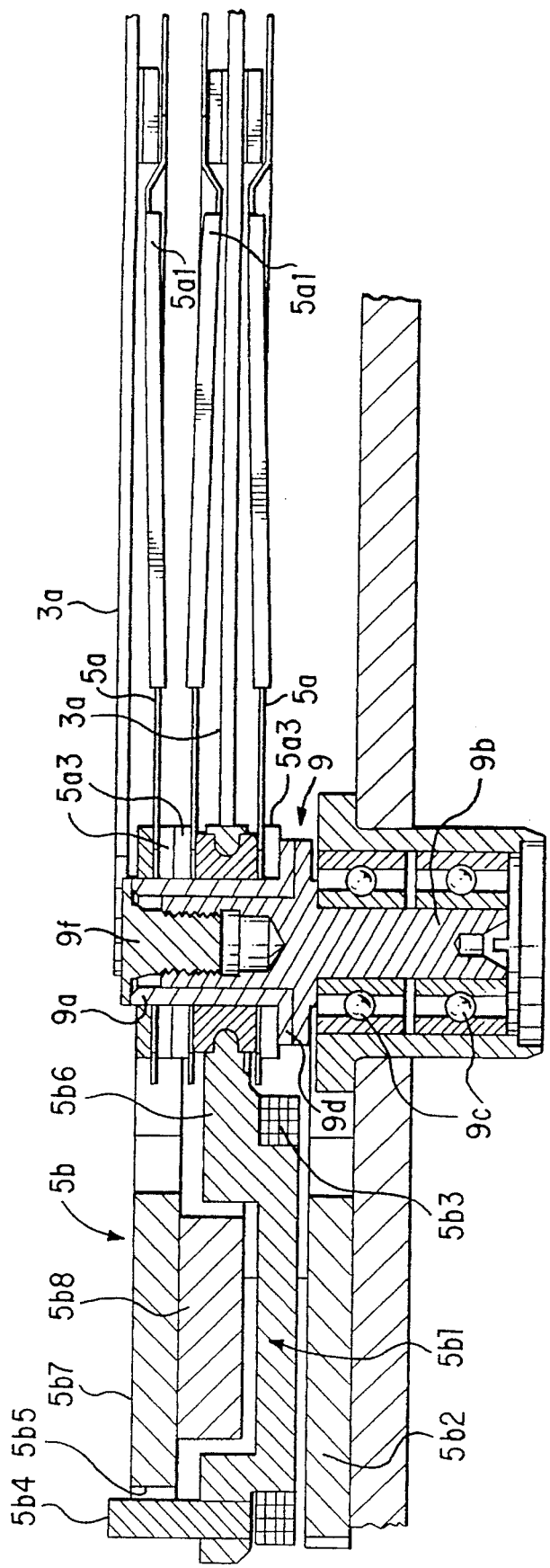
FIG. 3 is an enlarged sectional view of the rotary actuator assembly of FIG. 1 taken on the line III—III.

The structural details of the rotary actuator assembly 5 are best seen in the enlarged sectional view of FIG. 3. Here, for a specific disk drive, the disk stack 3 comprises two axially spaced disks, each designated 3a. The number of disks employed, within mechanical limits, is determined by the amount of data storage that is required for a particular application. The invention may be practiced using one or more disks.

The spindle assembly 9 of the rotary actuator assembly 5 comprises a tubular hub or cylindrical member 9a which is the upper section of the spindle 9. The tubular hub 9a is preferably a slip fit over an extension of a lower spindle section 9b and is thereby coaxially joined to the lower spindle section 9b. The lower spindle section 9b is journaled in a coaxial bearing pair 9c in the base 1. This coaxial spindle assembly 9 is secured by a screw 9f which threads into an axially threaded hole in the extension of the lower spindle section 9b.

The Tubular hub 9a has a peripheral flange 9d. The flange may be continuous or may comprise circumferentially spaced sectors. All of the parts of this rotary actuator assembly are assembled as a stack seated on the flange 9d of the tubular hub 9a. In particular, the parts in this stack comprise a plurality of load beams 5a (see also FIGS. 4 and 5) and the arm 5b6 of the coil support or housing 5b2, assembled on the tubular hub 9a in a particular sequence.

Figure 4:
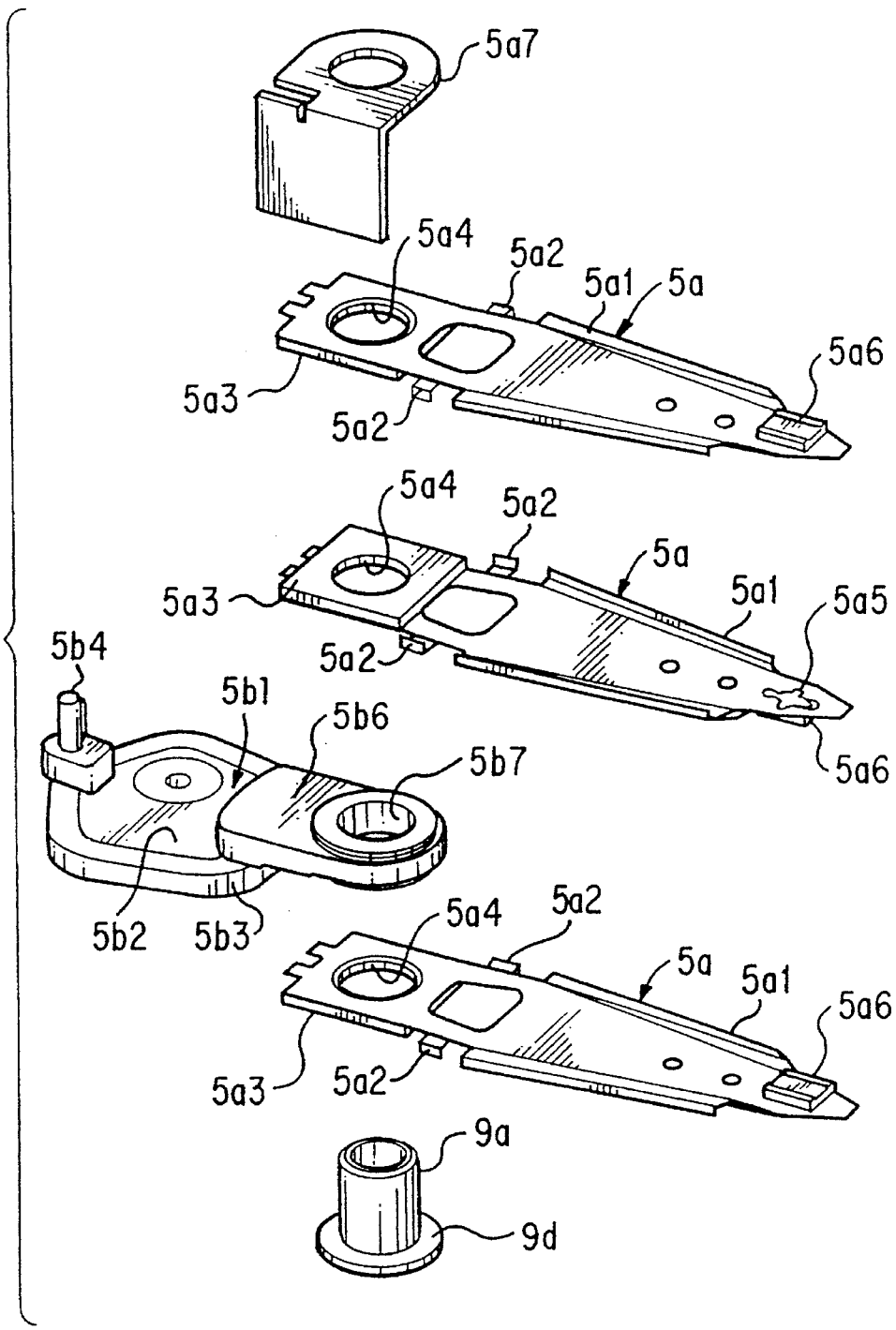
FIG. 4 is an exploded isometric view of a rotary actuator assembly according to this invention.
Figure 5:
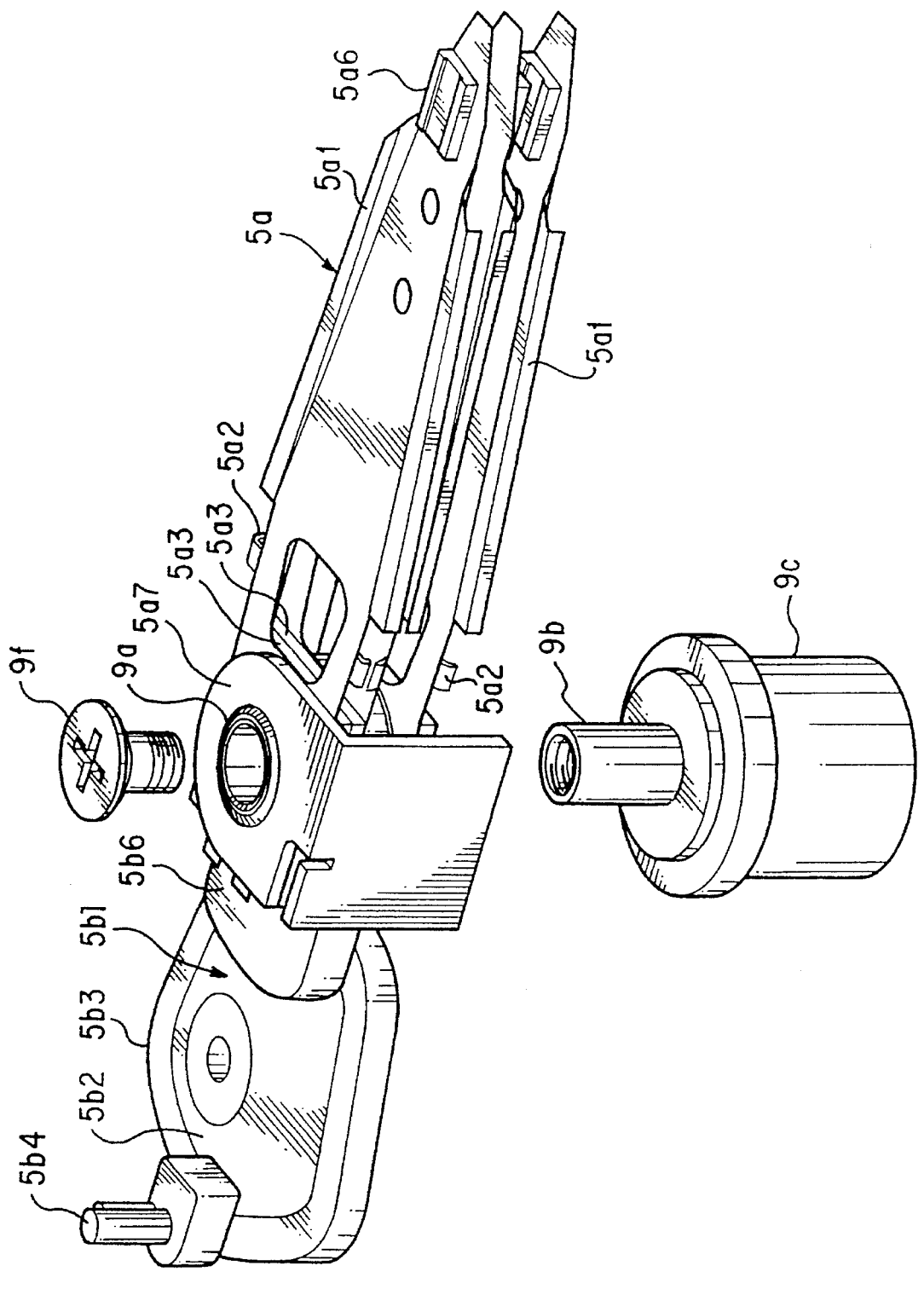
FIG. 5 is an isometric view of the three parts of the rotary actuator in exploded alignment for assembly.

The load beams 5a are configured as illustrated in FIGS. 4 and 5. In fabrication, they are etched from thin stainless steel sheet. In one practical embodiment of this invention, the stainless steel sheet was of the order of 3 mils thick. The flanges 5a1 are mechanically formed to provide the required load beam stiffness and stability. Tabs 5a2 are partially bent. Tab bending is completed at the time of installation of the transducer wires (not shown). The mounting end of each load beam comprises a reinforcing plate 5a3 which is welded to one side of the load beam, as viewed in FIG. 4. An opening or hole 5a4 is formed through the reinforcing plate 5a3 and the load beam 5a. The diameter of this hole or opening 5a4 is sufficient to provide a slip or sliding fit over the tubular hub 9a. The distal end of each load beam 5a has a leaf spring 5a5 attached thereto which functions as a gimbal mount for a transducer 5a6, such as a magnetic head, the slider of which is bonded thereto, as is well known. The transducer is mounted on the opposite side or face of the load beam 5a from that on which the reinforcing plate 5a3 is mounted.

The extension of the coil support or housing 5b2, represented in the arm 5b6, is also provided with an opening or hole 5b7 therethrough of a diameter to provide a slip or sliding fit over the cylindrical portion of the tubular hub 9a.

The thickness of the reinforcing plates 5a3 and of the arm 5b5 is related to the axial spacing of the disks. The minimum spacing of the disks is determined by the space required to clear the load beam/head assembly between the disks. Thus, for the assembly seen in FIG. 3, the reinforcing plates 5a3 when placed face to face, axially space the load beams 5a a distance apart which, together with any predetermined bend in the load beams, places the transducers 5a6 in the required spring loaded contact with the confronting surfaces of the axially spaced disks 3a. Similarly, the thickness of the arm 5b6 spaces the load beams 5a on each side thereof, as seen at the bottom of the stack in FIG. 3, to provide the required spring loading of the transducers against the opposite surfaces of the lowermost disk in the disk stack. The thickness of the arm 5b6 at the opening 5b7 is equal to the disk thickness plus twice the required height for spring loading of the load beams 5a.

If the transducer 5a6 is reversed in position on the load beam 5a from that seen in FIG. 5 and is placed on the same side of the load beam 5a as the reinforcing plate 5a3, then when the reinforcing plates 5a3 are placed in face-to-face contact, the transducers 5a6 confront one another and are properly spaced to make the required spring loaded contact with the opposite surfaces of a disk 3a. When the load beams 5a are placed on opposite sides of the arm 5b5 with the transducers 5a6 facing away from one another, the transducers 5a6 are spaced a distance apart to be properly spring loaded against the confronting surfaces of the axially spaced disks 3a.

For the transducer placement on the load beam seen in FIG. 4, the load beams 5a and the arm 5b6 of the coil support or housing 5b2 are loaded on the cylindrical member 9a in the sequence from bottom to top, as best seen in FIG. 3. A bracket 5a7 for supporting a flat flexible circuit or cable for the transducers 5a6, while not essential to this actuator assembly, is placed at the top of the stack. The bracket 5a7 has a useful purpose in the assembly operation in that the member which applies the compression force to the actuator stack bears against the bracket face. In the absence of the bracket, a bearing plate may be installed, if desired.

After this assembly, the load beams are aligned with one another and with the voice coil housing. A jig is useful for this purpose. The actuator stack thus formed is subject to axial pressure to compress the actuator stack against the flange 9d of the cylindrical member 9a. A swaging operation is then performed to expand the cylindrical member 9a into a secure compression engagement with the walls of the openings or holes in the load beams 3a and the arm 5b5, providing frictional restraint at and between the engaged faces in a degree to prevent any movement therebetween in the presence of environmental mechanical shock forces.

The swaging operation is advantageously performed using a swaging ball forced through the center hole of the tubular or cylindrical member 9a, starting at the end opposite the flange 9d, while the actuator stack is held in alignment and held in compression against the flange 9d. The assembly thus completed is coaxially joined to the lower spindle section 9b of the spindle 9.

While performance of the ball swaging operation is preferred as described above, the swaging operation may be reversed by forcing the swaging ball through the center hole of the tubular or cylindrical member 9a in the reverse direction.

For ball swaging, a cylindrical central opening in the tubular member is desirable. However, other cross sections are conceivable and feasible. Externally, the tubular member may comprise a longitudinal slot or key to automatically key or index load beams and the moving part of the actuator drive mechanism, having openings therein of corresponding cross section. Similarly, elliptical or angular cross sections, both internally and externally are contemplated within the scope of these teachings. Of course, the swaging tool is necessarily of the same cross section as the internal cross section of the tubular member, but slightly larger.

Although the transducer actuator assembly, according to this invention, is described as a rotary actuator which is the implementation of the best mode, this actuator is obviously applicable in a linear actuator type of disk drive by the simple expedient of attaching the tubular 9a to the linearly moving part of the linear drive motor or mechanism.

This transducer actuator structure eliminates unnecessary structure. The light weight load beam is scaled to the size of the disk and is particularly useful in small form factor drives, such as those of 3.5 form factor and less. This eliminates unnecessary structure, especially the cast arms of the type of Coon et al. This reduces both the actuator mass and the parts count. Reduction of the actuator mass reduces the actuator drive power requirements and/or reduces the time to access a target track, the seek time. Reduction of the parts count reduces the inventory of parts, reducing the overhead cost burden. The elimination of parts from the drive eliminates that aspect of the cost and, with fewer parts, reduces the assembly cost, to reduce the total cost of the drive.

What is claimed is:

1. A method of fabricating an actuator assembly for a disk drive, comprising:

providing a tubular member having a flange;

providing at least one load beam having a hole therethrough sized to slide over said tubular member;

providing a motor coil housing;

providing a motor coil on said motor coil housing, said motor coil housing having a hole therethrough that is sized to slide over said tubular member;

stacking said at least one load beam and said motor coil housing on said tubular member in a predetermined sequence forming a stack seated upon said flange;

compressing said stack of load beam and motor coil housing against said flange; and expanding said tubular member, while maintaining said stack in compression, to compressively engage said tubular member in each said hole to frictionally secure said at least one load beam and said motor coil housing to said tubular member;

rotatably mounting said tubular member for rotation about a longitudinal axis of said tubular member.

2. The invention according to claim 1, in which:

expanding said tubular member comprises ball swaging said tubular member internally.

3. A method of fabricating an actuator assembly for a disk drive, comprising:

a. providing a tubular member having an axial opening therethrough, having an external flange and having an external cylindrical surface;

b. providing at least one flexible load beam having a hole therethrough sized to slide over said tubular member;

c. providing a motor coil housing having an opening therethrough sized to slide over said tubular member;

d. providing a motor coil on said motor coil housing;

e. stacking said at least one load beam and said motor coil housing on said tubular member in predetermined sequence forming a stack seated upon said flange;

f. compressing said stack of load beam and motor coil housing against said external flange; and g. expanding said tubular member, while maintaining said stack in compression, to engage said at least one load beam and said motor coil housing in each said hole to frictionally secure said stack of said at least one load beam and said motor coil housing to said tubular member;

h. rotatably mounting said tubular member for rotation about the axial opening of said tubular member.

* * * * *